(12) United States Patent
Tanaka et al.

(10) Patent No.: US 11,207,754 B2
(45) Date of Patent: Dec. 28, 2021

(54) MACHINE TOOL

(71) Applicant: FANUC CORPORATION, Yamanashi (JP)

(72) Inventors: Shinichi Tanaka, Yamanashi (JP); Yuuzou Inaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/801,675

(22) Filed: Feb. 26, 2020

(65) Prior Publication Data

US 2020/0316739 A1 Oct. 8, 2020

(30) Foreign Application Priority Data

Apr. 2, 2019 (JP) .............................. JP2019-070586

(51) Int. Cl.
| | | |
|---|---|---|
| *B23Q 3/157* | (2006.01) | |
| *B23Q 11/00* | (2006.01) | |
| *B23Q 17/24* | (2006.01) | |
| *B23Q 3/155* | (2006.01) | |
| *B23Q 17/00* | (2006.01) | |

(52) U.S. Cl.
CPC ............ *B23Q 11/005* (2013.01); *B23Q 3/157* (2013.01); *B23Q 3/15534* (2016.11); *B23Q 11/0042* (2013.01); *B23Q 17/007* (2013.01); *B23Q 17/2452* (2013.01); *B23Q 3/15706* (2013.01); *Y10T 483/13* (2015.01); *Y10T 483/15* (2015.01); *Y10T 483/1795* (2015.01)

(58) Field of Classification Search
CPC ................. Y10T 483/15; Y10T 483/11; Y10T 409/304088; Y10T 483/13; B23Q 3/155–3/15793; B23Q 11/0042–11/0075; B23Q 17/2452; B23Q 17/007
USPC .................................... 483/13, 2, 7; 409/137
See application file for complete search history.

(56) References Cited

U.S. PATENT DOCUMENTS

| | | | | |
|---|---|---|---|---|
| 5,107,910 A | * | 4/1992 | Sasaki ................ | B23Q 3/15713 144/1.1 |
| 5,499,963 A | * | 3/1996 | Fujimoto ........... | B23Q 3/15706 483/54 |
| 6,409,641 B1 | * | 6/2002 | Hashimoto .......... | B23Q 3/1552 408/56 |
| 7,172,542 B2 | * | 2/2007 | Sato .................... | B23Q 3/15534 15/405 |
| 9,221,138 B2 | * | 12/2015 | Gerst ................. | B23Q 3/15534 |

(Continued)

FOREIGN PATENT DOCUMENTS

| | | | |
|---|---|---|---|
| CN | 203973289 U | * | 12/2014 |
| CN | 104972353 A | * | 10/2015 |

(Continued)

OTHER PUBLICATIONS

Machine Translation of JP 2009-233772 A, which JP '772 A was published Oct. 2009.*

(Continued)

*Primary Examiner* — Erica E Cadugan
(74) *Attorney, Agent, or Firm* — Maier & Maier, PLLC

(57) ABSTRACT

A machine tool includes a spindle configured to hold a tool, a tool magazine configured to hold a plurality of tools and to exchange the tools with the spindle, and a cleaning mechanism configured to remove adhering objects adhered to the tool magazine by spraying fluid to the tool magazine.

10 Claims, 3 Drawing Sheets

(56) References Cited

U.S. PATENT DOCUMENTS

| | | | |
|---|---|---|---|
| 9,682,453 B2* | 6/2017 | Isobe | B23Q 3/15534 |
| 9,707,653 B2* | 7/2017 | Isobe | B23Q 1/5406 |
| 2005/0032615 A1 | 2/2005 | Sato et al. | |
| 2012/0172185 A1* | 7/2012 | Yang | B23Q 11/005 |
| | | | 483/13 |
| 2017/0113314 A1* | 4/2017 | Murota | B23Q 17/2457 |
| 2017/0129064 A1* | 5/2017 | Uenishi | G05B 19/402 |
| 2017/0144262 A1 | 5/2017 | Okuda | |
| 2017/0225283 A1* | 8/2017 | Bodgan | B23Q 11/0064 |
| 2018/0264608 A1* | 9/2018 | Asano | B23Q 11/0075 |
| 2018/0267489 A1 | 9/2018 | Tango et al. | |

FOREIGN PATENT DOCUMENTS

| | | | |
|---|---|---|---|
| CN | 107470960 A * | 12/2017 | |
| DE | 2754636 A1 * | 6/1979 | |
| EP | 855245 A1 * | 7/1998 | |
| EP | 1504845 A1 | 2/2005 | |
| JP | S61274839 A | 12/1986 | |
| JP | H02-224829 A | 9/1990 | |
| JP | 2001-198761 A | 7/2001 | |
| JP | 2005-052948 A | 3/2005 | |
| JP | 2008155324 A | 7/2008 | |
| JP | 2009214280 A | 9/2009 | |
| JP | 2009-233772 A * | 10/2009 | |
| JP | 2015123567 A | 7/2015 | |
| JP | 2017094420 A | 6/2017 | |
| JP | 2018030202 A | 3/2018 | |
| JP | 2018153872 A | 10/2018 | |
| KR | 10-2012-0110380 A * | 10/2012 | |
| WO | WO-2018/070416 A1 * | 4/2018 | |

OTHER PUBLICATIONS

Machine Translationo of KR-10-2012-0110380-A, which KR '380 was published Oct. 2012.*

Machine Translation of CN 104972353 A, which CN '353 was published Oct. 2015.*

Machine Translation of CN-203973289-U, which CN '289 was published Dec. 2014.*

Machine Translation of CN 107470960-A, which CN '960 was published Dec. 2017.*

Japanese Office Action dated Jul. 20, 2021, in connection with corresponding JP Application No. 2019-070586 (7pp., including machine-generated English translation).

Japanese Search Report dated May 31, 2021, in connection with corresponding JP Application No. 2019-070586 (29 pp., including machine-generated English translation).

* cited by examiner

MACHINE TOOL

CROSS-REFERENCE TO RELATED APPLICATIONS

This application is based on and claims priority to Japanese Patent Application No. 2019-070586 filed on Apr. 2, 2019, the content of which is incorporated herein by reference in its entirety.

FIELD

The present invention relates to a machine tool.

BACKGROUND

When machining to a workpiece is carried out using a tool, machining dust is produced. There is known a machine tool having a function of washing machining dust adhering to the tool or the like with fluid (cf. Japanese Unexamined Patent Application Publication No. H02-224829, Japanese Unexamined Patent Application Publication No. 2001-198761 and Japanese Unexamined Patent Application Publication No. 2005-052948).

There is also known a machine tool having a tool magazine for holding a plurality of tools, and the machine tool exchanges tools between the tool magazine and a spindle (cf. Japanese Unexamined Patent Application Publication No. 2001-198761 and Japanese Unexamined Patent Application Publication No. 2005-052948).

SUMMARY

An aspect of the present disclosure provides a machine tool including a spindle configured to hold a tool, a tool magazine configured to hold a plurality of tools and to exchange the tools with the spindle, and a cleaning mechanism configured to remove adhering objects adhered to the tool magazine by spraying fluid to the tool magazine.

DETAILED DESCRIPTION

Hereinafter, a machine tool 1 according to an embodiment will be described with reference to the drawings.

Figure 1:
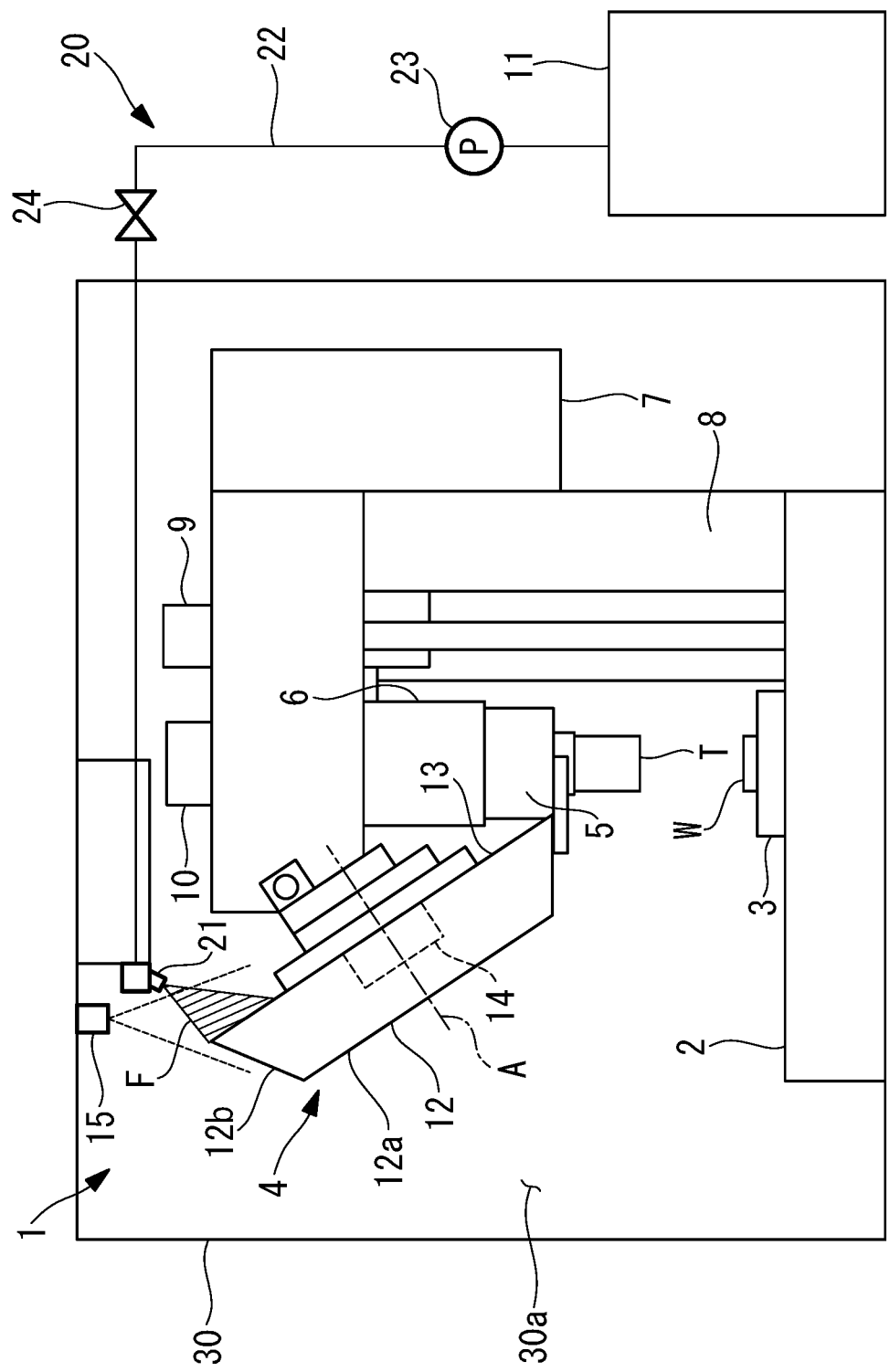
FIG. 1 is a side view of a machine tool according to an embodiment.
Figure 2:
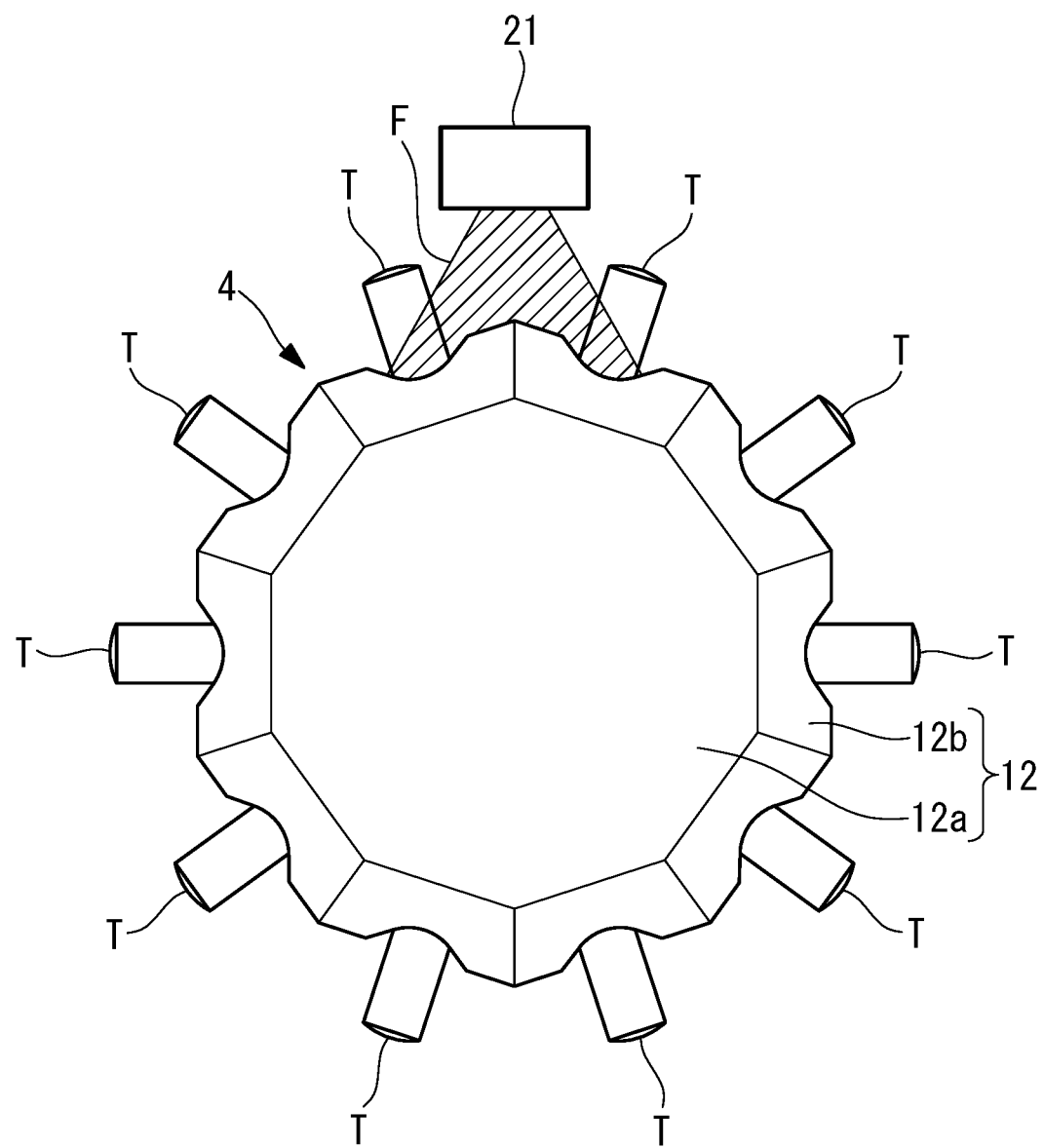
FIG. 2 is a front view of a tool magazine of the machine tool shown in FIG. 1.

As shown in FIG. 1 and FIG. 2, the machine tool 1 includes: a bed 2; a table 3 on which a workpiece W is fixed; a tool magazine 4 that holds a plurality of tools T; a spindle 5 that selectively holds one of the plurality of tools T; a spindle head 6 that supports the spindle 5; and a controller 7 that controls operations of the table 3, the tool magazine 4, and the spindle 5. The machine tool 1 is placed within a machining room 30a enclosed by a box-shaped cover 30.

The table 3 is placed on the bed 2, and moved by a feed axis motor (not shown) in a horizontal direction with respect to the bed 2. At a back side of the table 3, a column 8 that is fixed to the bed, 2 and extends from the bed 2 upward in a vertical direction is arranged. The tool magazine 4 is supported at an upper end of the column 8. Further, the spindle head 6 is also supported at the upper end of the column 8 movably in the vertical direction, and the spindle 5 is supported at the spindle head 6 so as to be rotatable around a longitudinal axis of the spindle 5. To the column 8, a Z-axis motor 9 that moves the spindle head 6 in the vertical direction is fixed, and a spindle motor 10 that rotates the spindle 5 around the longitudinal axis is fixed to an upper end of the spindle head 6. The machine tool 1 relatively moves the table 3 and the spindle 5 while rotating the spindle 5, and thus carries out machining to the workpiece W using the rotating tool T. Further, the machine tool 1 has a function of automatically exchanging the tools T between the tool magazine 4 and the spindle 5.

The machine tool 1 includes a tank 11 for retaining cutting fluid (fluid) F for machining, and supplies the cutting fluid F to the tool T and the workpiece W from the tank 11 during machining to the workpiece W using the tool T. The cutting fluid F supplied to the tool T and the workpiece W returns to the tank 11 through a circulation route (not shown), and is purified through the circulation route.

The tool magazine 4 includes substantially circular box-shaped covers 12 and 13. Within the covers 12 and 13, a plurality of tool holders (not shown) are arranged at an interval in a circumferential direction around a central axis A of the tool magazine 4, and the tool holders respectively hold the tools T. The covers include a front cover 12 that is arranged at a front side, and a back cover 13 that is arranged at a back side. The front cover 12 includes a front panel 12a having a substantially circular-plate shape and a side panel 12b having a substantially annular shape. The back cover 13 is a back panel having a substantially circular-plate shape.

The front cover 12 and the plurality of tool holders are integrally rotated around the central axis A by a rotatory motor 14. By the rotation of the plurality of tool holders, the plurality of tool holders are alternatively positioned at a tool changing position which is at a lower end. The tool magazine 4 is positioned at a front side relative to the spindle head 6 and inclined forwardly, and the tool holder at a tool changing position at a lower end is positioned near the spindle 5. The machine tool 1 exchanges the tool T held by the spindle 5, by exchanging the tools T between the tool holder at the tool changing position and the spindle 5.

The machine tool 1 also includes a cleaning mechanism 20 for cleaning the tool magazine 4. The cleaning mechanism 20 includes: a nozzle 21; a flow channel 22 that connects the nozzle 21 with the tank 11; a pump 23 that feeds the cutting fluid F into the flow channel 22 from the tank 11 to the nozzle 21; and a solenoid valve 24 provided in the flow channel 22. The pump 23 may be common with a pump for supplying the cutting fluid to the tool T. The nozzle 21 is provided around the tool magazine 4. By opening the solenoid valve 24 and actuating the pump 23, the cutting fluid F is sprayed to the tool magazine 4 through the nozzle 21, and machining deposits such as machining dust adhered to the tool magazine 4 are removed by the cutting fluid F. Specifically, a part of the cutting fluid F for machining is used for cleaning of the tool magazine 4. The pump 23 and the solenoid valve 24 are controlled by the controller 7.

It is preferable that the nozzle 21 is arranged above and at a back side of the tool magazine 4, and that the cutting fluid F is sprayed to an outer surface of an upper portion of the back cover 13 from obliquely from the back side. For example, the nozzle 21 is fixed to a ceiling portion of the cover 30. Machining dust produced in machine processes of the workpiece W by the tool T is often stirred up within the machining room 30a. As a space between the back cover 13 and the spindle head 6 is gradually narrowed from top to bottom, machining dust falling down to the tool magazine 4 is likely adhered to an outer surface of an upper portion of the back cover 13. The machining dust adhered to the upper portion of the back cover 13 is effectively removed by the cutting fluid F sprayed through the nozzle 21.

Another nozzle may be arranged at a different position within the machining room 30*a*. For example, as machining dust is likely to adhere to the side panel 12*b*, another nozzle may be arranged immediately above the tool magazine 4, and the cutting fluid F may be sprayed to an upper portion of the side panel 12*b* from immediately above.

In order that the cutting fluid F is sprayed to a wider area of the outer surface of the tool magazine 4, it is preferable that the nozzle 21 sprays the cutting fluid F in a sectoral or conical manner.

Further, the cleaning mechanism 20 may include, instead of the nozzle 21, a shower head having a plurality of nozzles, and may spray shower of the cutting fluid F to the tool magazine 4.

The controller 7 includes a processor, and a storage unit having a RAM, a ROM, a nonvolatile memory, or the like. The storage unit stores a processing program and a magazine cleaning program.

The controller 7 controls operations of the spindle 5, the table 3, and the tool magazine 4 by transmitting control commands to the feed axis motor, the Z-axis motor 9, the spindle motor 10, and the rotatory motor 14 according to the processing program, and executes machining to the workpiece W by the tool T and exchanging of the tools between the tool magazine 4 and the spindle 5.

Further, the controller 7 sprays cleaning fluid through the nozzle 21 for a defined period of time when exchanging the tools, by controlling the cleaning mechanism 20 according to the magazine cleaning program. The magazine cleaning program may be a part of the processing program, or may be a program that is separate from the processing program and executed in synchronization with the exchanging of the tools.

Next, an operation of the machine tool 1 will be described.

The machine tool 1 executes machining to the workpiece W and exchanging of the tools T according to the processing program. Further, when exchanging the tools, the machine tool 1 executes cleaning of the tool magazine 4 by the cleaning mechanism 20 according to the magazine cleaning program. Specifically, the controller 7 opens the solenoid valve 24 to actuate the pump 23 to feed the cutting fluid F from the tank 11 to the nozzle 21, and sprays the cutting fluid F through the nozzle 21 to a back surface of an upper portion of the tool magazine 4 for a defined period of time.

As the tool magazine 4 is disposed within the machining room 30*a* in which machining to the workpiece W by the tool T is carried out, machining deposits such as machining dust produced in machining to the workpiece W adhered to the tool magazine 4. In particular, by machining dust stirred up within the machining room 30*a* falling on the tool magazine 4, the machining dust is adhered to the upper portion of the side panel 12*b* and the upper portion of the back cover 13. While the machining dust on the side panel 12*b* falls by rotation of the front cover 12 when the tools are exchanged, the machining dust on the upper portion of the stationary back cover 13 remains there. If the machining dust continues to accumulate on the upper portion of the back cover 13, a large amount of machining dust may suddenly fall from the tool magazine 4, and machining dust adhered to the workpiece W and the tool T may possibly cause defective machining of the workpiece W and an malfunction of the tool magazine 4 and the spindle 5.

According to this embodiment, by spraying the cutting fluid F through the nozzle 21 to the upper portion of the back cover 13 when the tools are exchanged, machining deposit adhered to the upper portion of the back cover 13 are removed periodically. Therefore, it is possible to prevent machining deposits such as machining dust from accumulating on the outer surface of the back cover 13, as well as occurrence of defective machining and malfunctions due to the machining dust.

Further, at the time when the tools are exchanged, the spindle head 6 and the spindle motor 10 are at high positions and a distance between the spindle motor 10 and the back cover 13 is large, the spindle head 6 and the spindle motor 10 are moved down toward the table 3 when machining to the workpiece W is performed. According to this embodiment, by cleaning the tool magazine 4 when the tools are exchanged, it is possible to prevent the cutting fluid F from being sprayed on the spindle motor 10.

According to the above embodiment, the cleaning mechanism 20 sprays the cutting fluid F as fluid, but may spray compressed air, instead.

The compressed air is used as sealing air for preventing the cutting fluid or the like from entering into a power source of a movable portion or the mechanism of the machine tool 1, and supplied to a housing and the like of the movable portion or a mechanism unit from the air source via an air line. In this case, the cleaning mechanism includes: a nozzle; a flow channel connecting the nozzle with the air line; and a solenoid valve provided in the flow channel, and a part of compressed air for driving the machine tool 1 is used for cleaning of the tool magazine 4.

According to the above embodiment, the cleaning mechanism 20 sprays the fluid F for defined period of time when the tools are exchanged, but timing at and a time length during which the cleaning mechanism 20 sprays the fluid F may be arbitrarily changed.

For example, by an operator changing setting of the magazine cleaning program, the timing and the time length for spraying may be arbitrarily changed. Additionally, the time for spraying may not be constant.

Alternatively, the cleaning mechanism 20 may keep spraying the fluid F during execution of the processing program. In this case, it is preferable to provide a waterproof measure for the spindle motor 10 so that the cutting fluid F does not affect the spindle motor 10.

According to the above embodiment, the timing at and the time length during which the cleaning mechanism 20 sprays the fluid F may be set based on the machining program.

A part of the processing performed by the machine tool 1 is affected by the fluid F. For example, in case of performing measurement of the workpiece W by a probe held by the spindle 5, the fluid F or machining dust removed from the tool magazine 4 by the fluid F may possibly hinder accurate measurement. Likewise, in case of precision machining to the workpiece W, the fluid F or machining dust may possibly hinder accurate machining. Therefore, it is preferable that the timing at which the fluid F is sprayed is set excluding the timing during an operation that may be affected by the fluid F or machining dust.

The time length for spraying the fluid F may be set according to a type of machining. An amount of machining dust produced varies depending on the type of machining. Therefore, the time length for spraying the fluid F may be decreased when the tools are exchanged after machining in which a small amount of machining dust is produced, and may be increased when the tools are exchanged after machining in which a large amount of machining dust is produced.

According to the above embodiment, the time length during which the cleaning mechanism 20 sprays the fluid F may vary proportional to a time length during which machining is performed to the workpiece W by the tool T.

The longer the time length during which machining is performed to the workpiece W by the tool T, the larger the amount of machining dust produced. Therefore, it is possible to remove machining dust adhered to the tool magazine 4 more reliably by increasing the time length for spraying the fluid F as the time during which machining is performed to the workpiece W becomes longer.

According to the above embodiment, as shown in FIG. 1, an adhesion amount detecting unit 15 for detecting an amount of machining deposits adhered to the tool magazine 4 may be further provided.

When the amount of machining deposits detected by the adhesion amount detecting unit 15 exceeds a predetermined threshold value, the controller 7 controls the solenoid valve 24 and the pump 23 to spray the fluid F through the nozzle 21. With this, it is possible to prevent machining deposits from being accumulated on the tool magazine 4 more reliably.

One example of the adhesion amount detecting unit 15 includes: a camera acquiring an image of the tool magazine 4; and an image processor that calculates an amount of machining deposits based on the image. It is preferable that the camera is positioned above the tool magazine 4 so that the upper portion of the back cover 13 is included within a visual field of the camera. Another example of the adhesion amount detecting unit 15 includes: a distance sensor that measures a distance to the covers 12 and 13 of the tool magazine 4; and a processor that calculates an amount of machining deposits based on the distance measured by the distance sensor. A different example of the adhesion amount detecting unit 15 includes: a surface roughness measurement unit that measures surface roughness of the outer surface of the covers 12 and 13; and a processor that calculates an amount of machining deposits based on the surface roughness measured by the surface roughness measurement unit.

In the above embodiment, at least one of a spraying direction and a flow rate of the fluid F sprayed through the nozzle 21 may be changeable.

For example, a motor (not shown) for changing an orientation of the nozzle 21 may be provided, and the controller 7 may change the orientation of the nozzle 21 using the motor while the fluid F is sprayed through the nozzle 21. With this, machining deposits in a wider area of the outer surface of the tool magazine 4 may be removed by the fluid F.

The flow channel 22 may be provided with a flow rate adjustment valve that changes the flow rate of the fluid F, and the controller 7 may use the flow rate adjustment valve to change the flow rate of the fluid F through the nozzle 21. For example, the controller 7 may change the flow rate of the fluid F according to an amount of produced machining dust. Further, the controller 7 may spray the fluid F through the nozzle 21 with a predetermined temporal pattern by changing the flow rate of the fluid F while the fluid F is sprayed through the nozzle 21.

Figure 3:
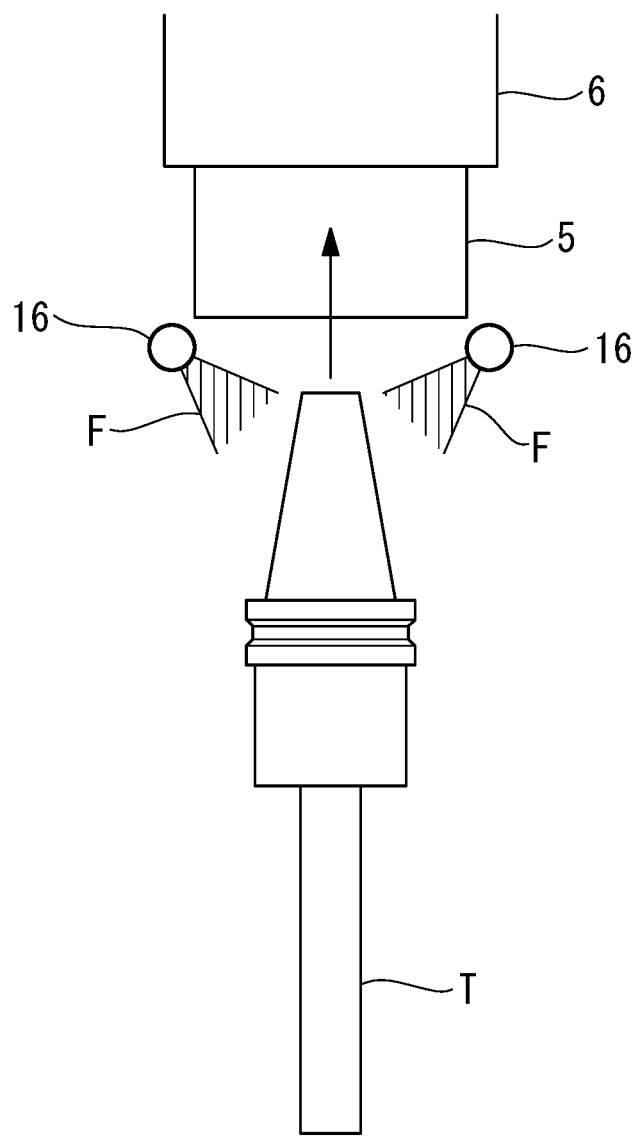
FIG. 3 is a partial side view of a variation of the machine tool shown in FIG. 1.

Machining deposits such as machining dust may possibly adheres to the tools T held by the tool magazine 4. As the machining deposits adhered to the tool T may possibly affects the spindle 5, it is preferable to remove machining dust from the tool T before attachment to the spindle 5. Therefore, as shown in FIG. 3, a nozzle 16 for cleaning the tool T may be provided near a lower end of the spindle 5.

For example, the nozzle 16 is fixed to the spindle head 6, and sprays the cutting fluid F from the tank 11 similarly to the nozzle 21. When the tool T is attached to the spindle 5, the tool T and the spindle 5 at the tool changing position relatively move closer to each other due to a relative movement of the tool magazine 4 and the spindle 5 in the vertical direction. The nozzle 16 sprays the fluid F to the tool T that is relatively moving with respect to the spindle 5. With this, in a process of attachment of the tool T to the spindle 5, machining deposits adhered to the tool T are removed by the fluid F.

According to the above embodiment, it is possible to further provide a learning unit that performs learning of the cleaning mechanism 20 in order to optimize a condition for spraying the fluid F.

For example, the spraying condition of the fluid F and the amount of machining deposits detected by the adhesion amount detecting unit 15 after spraying of the fluid F are stored in the storage unit of the controller 7 as learned data. Examples of the spraying condition include the time length, the flow rate, the temporal pattern, and the like for spraying the fluid F. The learning unit is, for example, a learning program stored in the storage unit of the controller 7. By learning based on the learning program using the learned data, the controller 7 learns an optimal condition for spraying with which machining deposits can be sufficiently removed. By spraying the fluid F through the nozzle 21 with such an optimal spraying condition, it is possible to improve cleaning efficiency of the tool magazine 4.

The learned data may further include types of the workpiece W and machining. An amount of produced machining dust varies depending on the types of the workpiece W and machining. Therefore, it is possible to learn a more optimal spraying condition by considering the types of the workpiece W and machining.

The invention claimed is:

1. A machine tool comprising:
    a spindle configured to hold a tool;
    a tool magazine configured to hold a plurality of tools, and to exchange the tools with the spindle; and
    a cleaning mechanism configured to remove adhering objects adhered to the tool magazine by spraying fluid by a nozzle to a back side of the tool magazine, wherein
    the tool magazine is placed at a front side of the machine tool relative to the spindle,
    at least part of the tool magazine is configured to rotate around a center axis line of the tool magazine, the center axis line extending in a front-back direction of the machine tool, and
    the cleaning mechanism is configured to spray the fluid by the nozzle toward a portion of the tool magazine, wherein the portion is located above the center axis line and at the back side of the tool magazine.

2. The machine tool according to claim 1, wherein the nozzle is placed above the center axis line.

3. The machine tool according to claim 1, wherein timing at and a time length during which the cleaning mechanism sprays the fluid are changeable.

4. The machine tool according to claim 1, wherein timing at and a time length during which the cleaning mechanism sprays the fluid are set based on a processing program.

5. The machine tool according to claim 1, wherein a time length during which the cleaning mechanism sprays the fluid changes in proportion to a time length for machining a workpiece using the tool.

6. The machine tool according to claim 1, wherein the cleaning mechanism sprays the fluid during a process in which the tool is exchanged between the spindle and the tool magazine.

7. The machine tool according to claim 1, wherein the fluid is cutting fluid.

8. The machine tool according to claim 1, wherein the fluid is compressed air.

9. A machine tool comprising:
a spindle configured to hold a tool;
a tool magazine configured to hold a plurality of tools, and to exchange the tools with the spindle;
a cleaning mechanism configured to remove adhering objects adhered to the tool magazine by spraying fluid to the tool magazine; and
a camera or a sensor configured to detect an amount of adhering objects adhered to the tool magazine,
wherein the cleaning mechanism sprays the fluid when the amount of adhering objects detected by the camera or the sensor exceeds a predetermined threshold value.

10. A machine tool comprising:
a spindle configured to hold a tool;
a tool magazine configured to hold a plurality of tools, and to exchange the tools with the spindle;
a cleaning mechanism configured to remove adhering objects adhered to the tool magazine by spraying fluid to the tool magazine;
a camera or a sensor configured to detect an amount of adhering objects adhered to the tool magazine; and
a controller configured to carry out processing programs, wherein the controller is configured to evaluate feedback on an amount of the adhering objects from the camera or the sensor in response to spraying fluid under one or more attempted spraying conditions in order to determine optimized conditions for spraying the fluid, by which optimized conditions adhering objects can be removed from the tool magazine.

* * * * *